United States Patent

Tachick

[15] 3,639,833
[45] Feb. 1, 1972

[54] SOLID-STATE VOLTAGE AND FAULT DETECTOR MEANS HAVING INTEGRAL CIRCUIT INTEGRITY INDICATORS

[72] Inventor: Henry N. Tachick, Pittsfield, Mass.
[73] Assignee: General Electric Company
[22] Filed: May 11, 1970
[21] Appl. No.: 36,053

[52] U.S. Cl. ............................... 324/51, 324/72.5, 324/133
[51] Int. Cl. .......................................................... G01r 31/02
[58] Field of Search ............................... 324/51, 72.5, 133

[56] References Cited

UNITED STATES PATENTS

| | | | |
|---|---|---|---|
| 3,416,074 | 12/1968 | Schoonover | 324/51 |
| 3,345,565 | 10/1967 | Cotter | 324/51 |

FOREIGN PATENTS OR APPLICATIONS

| | | | |
|---|---|---|---|
| 1,407,867 | 6/1965 | France | 324/51 |
| 956,913 | 4/1964 | Great Britain | 324/51 |

*Primary Examiner*—Gerard R. Strecker
*Attorney*—Francis X. Doyle, Vale P. Myles, Frank L. Neuhauser, Oscar B. Waddell and Joseph B. Forman

[57] ABSTRACT

Solid-state detector circuit and portable circuit housing for safely sensing the presence of a voltage or a fault in a high-voltage electric power distribution system. The apparatus is housed in a unitary case and is provided with interchangeable probes to permit it to be either directly or indirectly coupled to a circuit under test. Integral indicating means are provided for selectively monitoring the integrity of the detector circuit to assure its operability before and after it is used on a high-voltage circuit, thereby affording a safeguard for personnel using information provided by the detector.

7 Claims, 4 Drawing Figures

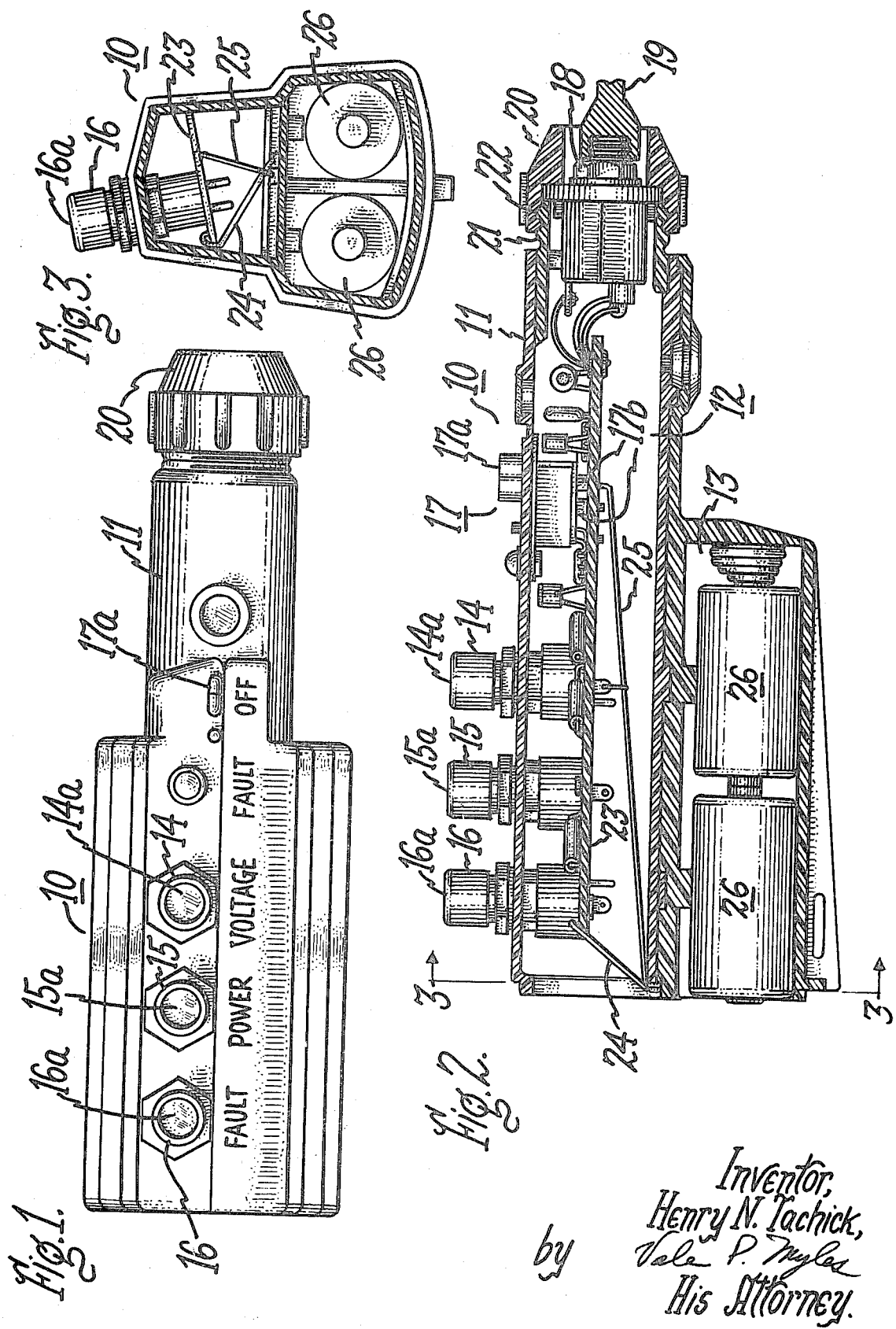

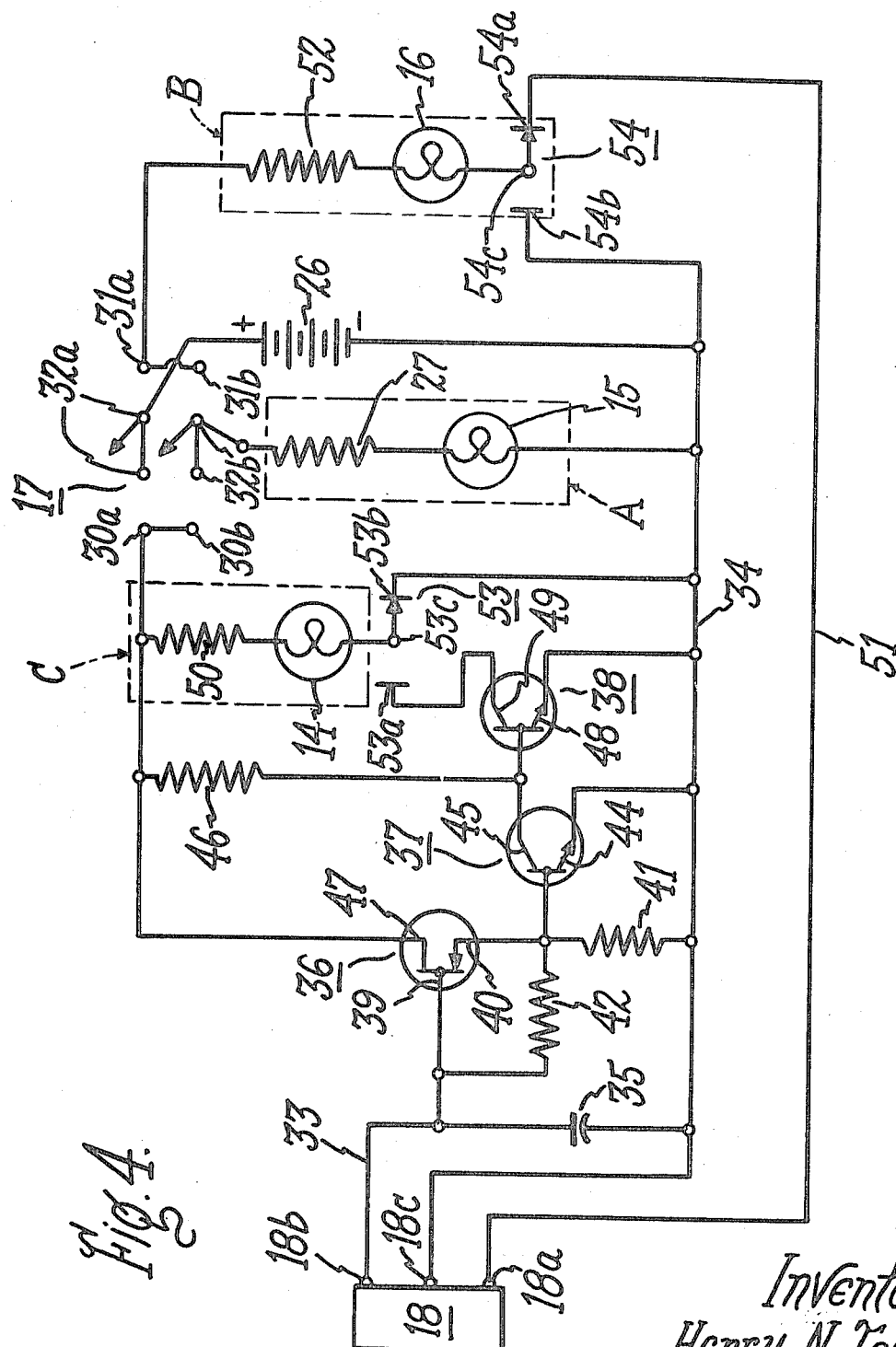

SOLID-STATE VOLTAGE AND FAULT DETECTOR MEANS HAVING INTEGRAL CIRCUIT INTEGRITY INDICATORS

INTRODUCTORY STATEMENT

The present invention relates to improved monitoring apparatus and, more particularly, to a portable hand-held monitoring apparatus for sensing the presence or absence of a voltage or fault within overhead or underground high-voltage electrical distribution systems.

BACKGROUND OF THE INVENTION

Heretofore, there has been no adequate single detector known to applicant for detecting both the presence or absence of a fault or a voltage within an underground electrical distribution system. Of course, prior art detectors have been capable of monitoring either a fault or voltage within an overhead distribution system, however, such detectors generally have lacked the sensitivity necessary to enable them to be used in underground high-voltage systems. One type of prior art detector that has been generally utilized to signal the presence of a voltage on insulated electric circuits utilizes the electromagnetic field effect. When such a detector is placed within an electromagnetic field of a high-voltage electrical distribution system and the field is of sufficient strength, a neon lamp is caused to glow and indicate the presence of a voltage on the system. If this type of device is to be used to monitor an underground distribution system, it is necessary to make provision for a direct contact between the device and an exposed capacitance voltage divider on the system. In underground applications, the use of an exposed capacitance voltage divider normally necessitates the use of a voltage divider seal cap. The present invention not only provides an improved indicator with greater sensitivity, but it eliminates the sealing problems associated with an exposed voltage divider by permitting use of an insulated voltage divider in the high-voltage system.

Accordingly, it is one object of the present invention to provide improved highly sensitive indicator apparatus that is capable of monitoring an insulated electrical system to ascertain either the presence or absence of a voltage or a fault within the system whether it is an underground or an overhead distribution system.

It is a further object of the present invention to provide an improved voltage and fault indicator which is economical to manufacture and simple to use.

Another object of the invention is to provide an easily portable, hand-held indicating device that can be rapidly placed into operation to monitor voltage and fault conditions on an underground electric power distribution system.

Other objects and advantages of the present invention will be apparent to those skilled in the art.

SUMMARY STATEMENT

Briefly stated, in accordance with one embodiment of my invention, there is provided a portable voltage and fault indicator including a casing having an elongated upper compartment and a lower compartment adjacent to and depending therefrom. Situated within the upper compartment are; a plurality of indicating light assemblies that have signal transmitting windows respectively extending exterior of the casing and electrical connection terminals positioned interior thereof, a plural-position switch means having a switch position selector extending exterior of the casing and electrical connection terminals mounted interior thereof, and electric circuitry associated with the apparatus. A power supply for operating the apparatus is situated within the lower or depending compartment.

BRIEF DESCRIPTION OF THE DRAWINGS

While the specification concludes with claims that particularly point out and distinctly claim the subject matter which I regard as my invention, it is believed that the invention will be better understood from the following description taken in connection with the accompanying drawings in which:

FIG. 1 is a top view of a portable hand-held voltage and fault indicator constructed pursuant to the invention;

FIG. 2 is a side view of the portable hand-held voltage and fault indicator shown in FIG. 1, with a portion of the outer casing removed to expose the internal component parts to view;

FIG. 3 is a cross-sectional view of the portable hand-held voltage and fault indicator shown in FIGS. 1 and 2, taken along line 3—3 in FIG. 1; and FIG. 4 is a diagram of the circuitry utilized within one embodiment of the portable hand-held voltage and fault indicator of the invention.

DETAILED DESCRIPTION OF A PREFERRED EMBODIMENT

Referring now to FIGS. 1–3, pursuant to the present invention, there is shown a hand-held, portable voltage and fault indicator 10, comprising an insulating casing 11, which has an enlarged upper compartment 12, and a shorter depending lower compartment 13 contiguous with a portion of the upper compartment. The compartments 12 and 13 are molded integrally of a suitable high-impact thermal setting plastic. Included within the upper compartment 12 are a plurality of indicator lamps 14, 15 and 16, which are mounted through suitably formed apertures in a wall of the casing 11 so their signal indicating windows 14a, 15a, and 16a are visible on the exterior of the casing while the electrical connection terminals for the lamps 14, 15 and 16 are positioned within compartment 12. In this embodiment of the invention, switch means 14b, 15b and 16b are associated respectively with lamps 14, 15 and 16. The indicator lamps 14 and 16 and their respective switch means 14b and 16b are formed as an integral unit wherein actuation of the individual switch means by depressing windows 14a and 16a respectively, moves contacts from a normally closed position to a second position for energizing and testing the lamps.

Also included within the upper compartment 12 is a three-position mode selector switch 17, which has a slidably-mounted switch position selector means 17a extending exterior the casing and has its electrical connection terminals 17b interior thereof. At one end of the upper compartment 12 and remote from the depending lower compartment 13, an input jack 18 is mounted to provide signal access to the detection circuit of the invention from a suitable probe 19. A sleeve 20 surrounds the input jack 18 and is maintained in place between two closely spaced beads 21 and 22, extending circumferentially about the upper compartment. The circuitry associated with the monitoring apparatus of the invention, which circuitry may preferably be fabricated on a printed circuit board 23, is also situated within the upper compartment 12. Extending from the lower compartment 13 into the upper elongated compartment 12 and into contact with the printed circuit board 23 are fingerlike projections 24 and 25 which electrically interconnect a power source 26, located within the lower compartment, to the mode selector switch 17 in the upper compartment. The power source 26 may be conventional batteries and the fingerlike members 24 and 25 may be copper wire or other suitable conductive means.

In order to describe the circuit contemplated by the invention, reference is now made to FIG. 4 wherein there is shown the double-pole, three position mode switch 17 that is provided with a neutral or open position and two closed positions. In the first closed position the shunt-connected fixed contacts 31a and 31b are connected by the switch to the terminals 32a, 32b and in the second closed position of switch 17 the movable contacts 32a and 32b are connected to the shunted, fixed contacts 30a and 30b. Contact 32a is electrically connected to one terminal of a battery or power source 26, the other terminal of said battery or power source 26 is connected to ground or other suitable voltage reference line 34. Contact 32b is connected to one side of a series circuit "A" comprising an indicator lamp 15 and a current limiting resistor 27, and the other side of the series circuit "A" is connected to ground or reference line 34.

Switch terminals 31a and 31b are electrically connected to one side of a second series circuit "B" comprising a current limiting resistor 52 and an indicator lamp 16. The other side of series circuit "B" is connected to the movable contact 54c of a switch 54, which is maintained in normally closed contact with a first fixed contact 54a of the switch. Fixed contact 54a is connected to one terminal 18a of input jack 18 by means of a conductor 51. Switch 54 is further provided with a second fixed contact 54b which is connected to ground or reference line 34. Switch 54 may be moved from its normally closed position to a position wherein contact is broken between the contacts 54a and 54c and established between contacts 54b and 54c for purposes hereinafter described. The foregoing circuitry comprises the essential fault indicating segments of the apparatus utilized in the preferred embodiment of my invention.

Fixed contacts 30a and 30b of switch 17 are connected to one side of a third series circuit "C" which comprises a current limiting resistor 50 and lamp 14. The other side of series circuit "C" is connected to a movable contact 53c of a switch 53 and is maintained in normally closed contact with a first fixed contact 53a of this switch. Movable contact 53c may be switched from its normally closed engagement with fixed contact 53a to engage a second fixed contact 53b of the switch, which contact is connected to ground or reference line 34.

First fixed contact 53a of switch 53 is connected to a voltage sensing circuit which will now be more fully described. The voltage sensing circuit comprises transistors 36, 37 and 38. Transistor 36 has a gate 39, a source 40 and a drain 47. Input to transistor 36 is provided between gate 39 and source 40 by connecting gate 39 to an input terminal 18b of jack 18 through conductor 33. A suitable capacitor 35 is connected between gate 39 and ground or reference line 34. Source 40 is connected to ground or reference line 34 through resistor 41 and bias for the gate 39 is obtained by providing a resistor 42 between the source 40 and gate 39. Drain 47 is connected to fixed contacts 30a and 30b of switch 17. The output of transistor 36 is obtained across the resistor 41 and is fed to the base 43 of transistor 37 from source 40 of transistor 36. Transistor 37 is further provided with an emitter 44 which is connected to ground or reference line 34 and a collector 45 which is connected through a resistor 46 to contacts 30a and 30b of switch 17. The output of transistor 37 is obtained at the collector 45 of transistor 37 and fed to the base 47 of transistor 38. The emitter 48 of transistor 38 is connected to ground or reference line 34 and the collector 49 of transistor 38 is connected to fixed contact 53a of switch 53. In effect, transistor 38 forms a switch in the series circuit comprising resistor 50 and lamp 14 to ground or reference line 34 which reference line 34 is also connected to a terminal 18c of input jack 18.

In operation, mode switch 17 may be selectively moved from its neutral position to a first position wherein the apparatus is available for testing the presence or absence of a fault in high-voltage distribution systems. In the first position, movable contacts 32a and 32b are placed in electrical circuit with fixed contacts 31a and 31b, respectively. First series circuit "A" is thereby completed from one terminal of battery 26 through contacts 32a, 31a, 31b, 32b, resistor 27, first indicator lamp 15 and back to the other terminal of battery 26. If indicator lamp 15 is illuminated by the current therethrough to give a visual indication, the apparatus is thereby indicated as in an operative mode. An operator may then test to determine whether or not the second series circuit "B" is operative. This is accomplished by moving movable contact 54c out of contact with fixed contact 54a and into contact with fixed contact 54b. A visual indication responsive to such action is provided by lamp 16. The lighting of lamp 16 shows that the series circuit "B" indicator is operative.

Return of switch contact 54c to its former position out of contact with fixed contact 54b and into contact with fixed contact 54a places the fault indicator in condition for use in a monitoring function. The circuit for the fault indicator includes battery 26, movable contact 32a and fixed contact 31a of switch 17, resistor 52, indicator lamp 16, movable contact 54c and fixed contact 54a of switch 54, conductor 51 and jack terminal 18a, which is normally connected to one terminal of probe 19 (See FIG. 2). A second terminal of the probe 19 is connected to terminal 18c and thence through ground or reference line 34 to the other terminal of battery 26. Thus, the interposition of a fault, or other type of short circuit including a low resistance path, between the first terminal of the probe 19 (18a) and the second terminal of the probe 19 (18c) causes indicator lamp 16 to give a visual indication of the fault. Absence of a short circuit or low resistance path between these first and second terminals of the probe 19 results in no visual indication being given by indicator lamp 16, so the apparatus shows the absence of a fault.

Movement of mode switch 17 from the first position to its second closed position places the apparatus in condition for detecting the presence or absence of voltage. As in the first position, the first series circuit "A" is again completed, however, in this position fixed contacts 30a and 30b are substituted for fixed contacts 31a and 31b. When indicator lamp 15 reacts to the current therethrough to give a visual indication, the apparatus is again indicated to be in an operative mode. Indicator lamp 14 may be tested for operativeness by moving movable contact 53c out of engagement with fixed contact 53a and into contact with fixed contact 53b. In the latter position a circuit for testing the continuity of circuit "C" and indicator lamp 14 is accomplished from battery 26, through contacts 32a, 30a, resistor 50, lamp 14, movable contact 53c and fixed contact 53b of switch 53, line 34 and the other side of battery 26. When indicator lamp 14 is illuminated by the current therethrough it gives a visual indication of its operability.

Input to the apparatus is obtained from probe 19 which senses a voltage or absence of voltage between terminals 18b and 18c of jack 18. In the absence of a voltage between terminals 18b and 18c transistor 36 is in a conductive state, biasing transistor 37 to a conductive state and consequently biasing transistor 38 to a nonconductive condition, in a manner well known to those skilled in the art. Nonconduction of transistor 38 causes an open circuit in series circuit "C" and indicator lamp 14 gives no indication, thus showing an absence of voltage.

In the presence of an alternating voltage between the terminals 18b and 18c, as obtained from suitable energization of probe 19, transistor 36 is biased to a nonconductive condition and transistor 38 becomes conductive, closing series circuit "C" and providing a current path through indicator lamp 14 from one side of battery 26, movable contact 32b and fixed contact 30b of switch 17, resistor 50, indicator 14, movable contact 53c and fixed contact 53a of switch 53, collector 49 and emitter 48 of transistor 38 and back to the other side of battery 26 through ground or reference conductor 34. Therefore, closure of the current path as described causes indicator lamp 14 to indicate the pressure or absence of a voltage at the probe 19.

From the foregoing description it will be apparent to those skilled in the art that the circuit of the invention illustrated in FIG. 4 affords means for amplifying a signal sensed at input jack 18 so that even a weak signal will be reliably indicated to an operator by selective energization of lamps 14, 15 or 16, in the manner discussed above. Thus, the apparatus of the invention can be used to detect the presence or absence of voltage on an insulated conductor, as well as by placing probe 19 in direct contact with an exposed metal electrode of a voltage-dividing capacitance tap on an insulated cable. Accordingly, the invention makes it possible to provide permanently sealed capacitance voltage dividers on electric cables and thereby reduces maintenance costs as well as original production costs for underground cable systems. It will also be appreciated that various alternative amplifying circuits equivalent to the circuit shown in FIG. 4 may be used to provide the desired amplifying function of the invention. However, to facilitate a more complete understanding of the preferred embodiment of the invention disclosed herein, representative values of the circuit components used in the circuit of the preferred embodiment of the invention, illustrated in FIG. 4, are listed below:

| Component | Value or Type |
| --- | --- |
| Transistor 36 | Type 2N3819 |
| Transistor 37 | Type 2N3417 |
| Transistor 38 | Type 2N3417 |
| Capacitor 35 | 750 micro-microfarads |
| Resistor 42 | 10 megaohms |
| Resistor 41 | 10,000 ohms |
| Resistor 46 | 10,000 ohms |
| Resistor 50 | 27 ohms |
| Resistor 27 | 39 ohms |
| Resistor 52 | 18 ohms |
| Lamps 14, 15, 16 | Type CM 338 |

While the invention has been described with particular reference to the construction shown in the drawings, it is understood that further modification may be made without departing from the true spirit and scope of my invention, which is defined by the claims appended hereto.

What I claim as new and desire to secure by Letters Patent of the United States is:

1. Apparatus for detecting the presence or absence of a voltage or a fault in high-voltage underground electric power transmission systems comprising:

a direct current power source, a plural position mode switch having means for selectively positioning said switch to a first position, a second position, and a neutral position, a first indicator lamp, a second indicator lamp, and a third indicator lamp, apparatus input means including a first terminal, a second terminal, and a third terminal, electrical circuitry responsive to the placement of said mode switch in said first position for applying a current from said power source through a first series circuit (A) including said first indicator lamp (15), and for applying current from said power source to a second series circuit (B) including said second indicator lamp (16) and said first and second terminals, said second series circuit being completed by a current-conducting connection between said first and said second terminals, electrical circuitry responsive to the placement of said mode switch in said second position for applying a current from said power source through said first series circuit (A) including said first indicator lamp (15), and for applying current from said power source to a third series circuit (C) including said third indicator lamp (14), a solid state switching means having a normally open circuit state and an activated closed circuit state, said solid state switching means having an input circuit connected to said first and third terminals and being responsive to a predetermined voltage applied across said first and third terminals to activate said switching means to a closed circuit state thereby to provide a current flow from said power source through said third indicator lamp, whereby the apparatus is operative to indicate the presence or absence of such a predetermined voltage.

2. Apparatus for detecting the presence or absence of a voltage or a fault in high-voltage transmission systems as defined in claim 1 and further including a casing having an elongated upper compartment and a lower compartment depending therefrom, said upper compartment having an open end remote from said lower compartment, said apparatus input means being mounted in said open end, said first, second, and third series circuits, said solid state switching means, said plural position mode switch, and said first, second, and third indicator lamps being mounted in said upper compartment, said power source being mounted in said lower compartment, and means extending from said lower to said upper compartment for electrically interconnecting said power source to said plural position mode switch.

3. Apparatus for detecting the presence or absence of a voltage or a fault in high-voltage transmission systems as defined in claim 2 and wherein said plural position mode switch includes a switch position selector extending exterior of said casing and electrical terminal connections extending interior of said casing.

4. Apparatus for detecting the presence or absence of a voltage or a fault in high-voltage transmission systems as defined in claim 3 and wherein each of said indicator lamps includes means for securing each of said lamps to said casing, each of said means for securing said lamps including signal indicating windows extending exterior of said casing and electrical connection terminals extending interior of said casing.

5. Apparatus for detecting the presence or absence of a voltage or a fault in high-voltage transmission systems as defined in claim 4 and wherein said apparatus input means comprises a multiterminal input jack.

6. Apparatus as defined in claim 1 including a manually operable switch (54) having two fixed contacts (54a and 54b) and a movable contact (54c), one of said fixed contacts (54b) being connected in series with indicator lamp (16) and power source, thereby to afford a circuit for testing indicator lamp (16) when the movable contact (54c) is in engagement with said one contact (54b).

7. Apparatus as defined in claim 6 including a second manually operable switch (53) having two fixed contacts (53a and 53b) and a movable contact (53c), one of said fixed contacts (53b) being connected in series with said indicator lamp (14) and said power source, thereby to afford a circuit for testing indicator lamp (14) when the movable contact (53c) engages said one contact (53b).

* * * * *